United States Patent [19]

Patti

[11] Patent Number: 4,950,036
[45] Date of Patent: Aug. 21, 1990

[54] WHEEL COVER FOR A VEHICLE

[76] Inventor: Tony Patti, 1001 Carden St., San Leandro, Calif. 94577

[21] Appl. No.: 364,128
[22] Filed: Jun. 12, 1989
[51] Int. Cl.$^5$ .............................................. B60B 7/06
[52] U.S. Cl. .............................. 301/37 S; 301/108 S; 411/156; 411/544
[58] Field of Search ............... 301/37 R, 37 S, 108 R, 301/108 S; 411/9–11, 149, 150, 155, 156, 533, 544

[56] References Cited

U.S. PATENT DOCUMENTS

| | | | |
|---|---|---|---|
| 1,585,401 | 5/1926 | Main | 301/108 S |
| 1,963,535 | 6/1934 | Trotter | 411/149 X |
| 2,198,721 | 4/1940 | Horn | 301/108 S |
| 4,240,670 | 12/1980 | Zorn et al. | 301/108 S X |
| 4,607,984 | 8/1986 | Cassidy | 411/11 X |
| 4,642,012 | 2/1987 | Blucher et al. | 411/533 X |

*Primary Examiner*—Russell D. Stormer
*Attorney, Agent, or Firm*—Bielen, Peterson & Lampe

[57] ABSTRACT

A wheel cover for a vehicle utilizing a mounting member including a first surface and opposite second surface. The mounting member also includes a multiplicity of openings of two types. The first type of larger opening fits over an existing lug bolt and nut of the vehicle wheel, while the second type of smaller opening merely fits over the lug bolt. Thus, removal of only certain nuts is required to hold the mounting member to a vehicle wheel. A multiplicity of resilient projections at least partially surround the second group of small openings. The resilient projections permit the normal seating of a lug nut with a lug bolt while employing the ramped portion of the lug nut to hold the mounting member and other wheel accessories to the vehicle wheel.

9 Claims, 1 Drawing Sheet

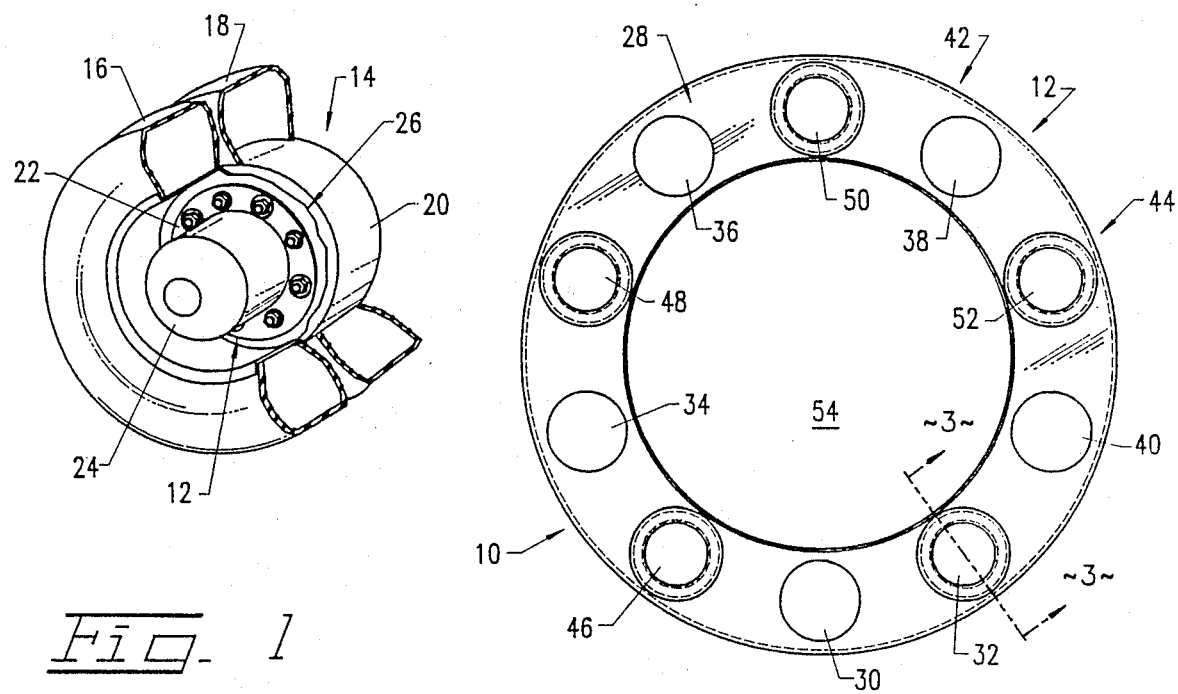
Fig. 1
Fig. 2
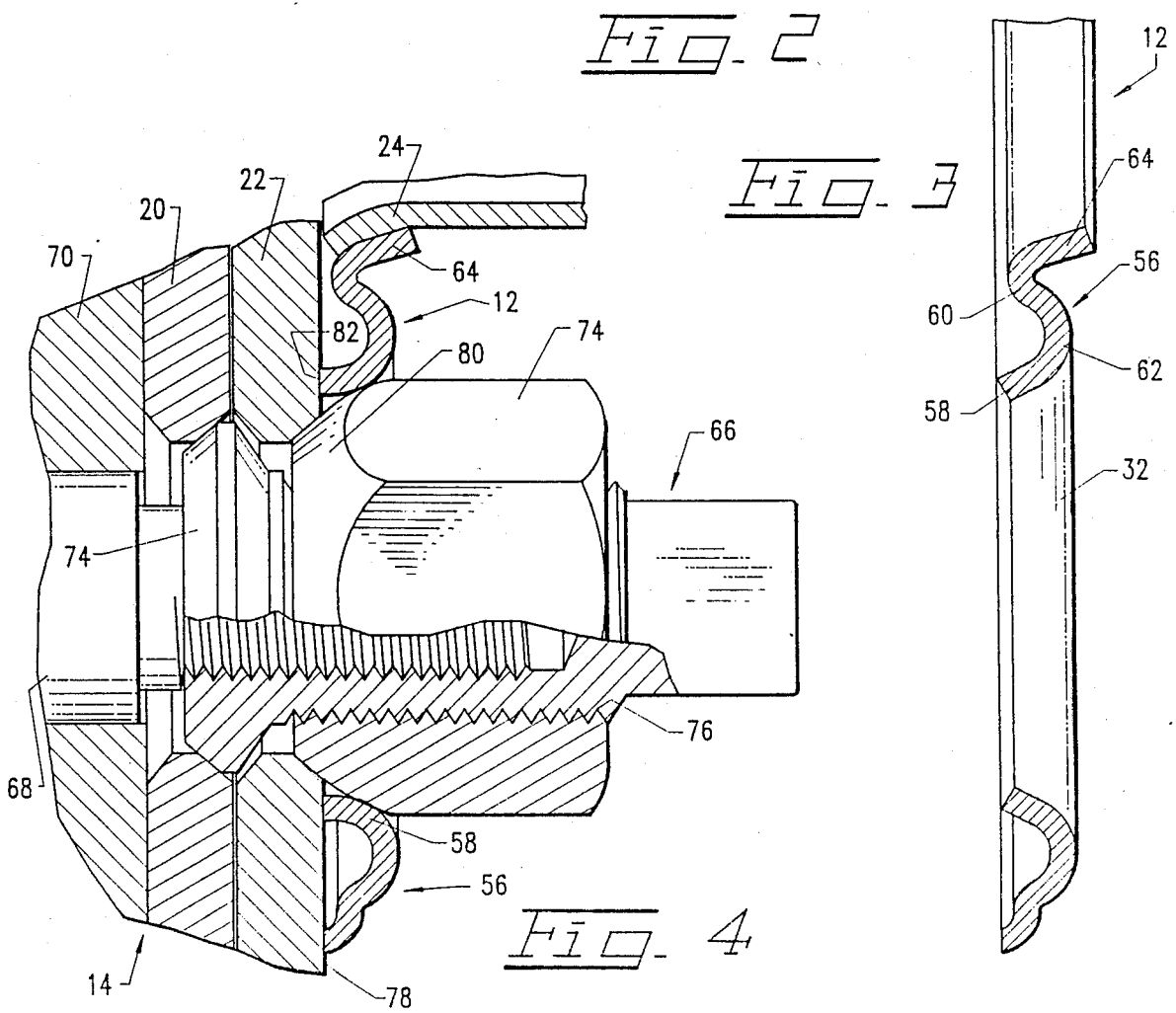
Fig. 3
Fig. 4

WHEEL COVER FOR A VEHICLE

BACKGROUND OF THE INVENTION

The present invention relates to a novel wheel cover for a vehicle. Wheel cover systems are widely used on vehicles to create an esthetic appearance on a vehicle wheel. Wheel covers are subjected to intense stress of rather long duration during normal operation of the vehicle which can cause a vehicle wheel cover to separate from a vehicle wheel. Often, the vehicle wheel cover is lost or causes damage and, possibly, injury to bystanders when separated from the wheel. Replacement of a lost wheel cover can be very expensive.

Reference is made to U.S. Pat. No. 4,240,670 which provides for a novel wheel cover which requires only the removal of every other lug nut on a particular wheel. Thus, installation of the vehicle cover described in U.S. Pat. No. 4,240,670 does not require the jacking or raising of a vehicle. Although the wheel cover system shown therein was a great advance, the use of separate washers with a flange plate or beauty ring complicates the wheel cover system. For example, separable washers are difficult to ship and pack. Also, washers are often not installed properly since gravity tends to pull a washer surrounding a lug nut downwardly causing a eccentric fit thereupon. Further, washers are often lost or not replaced after maintenance of the wheel requiring removal of the beauty ring or other wheel cover. Missing washers in such wheel mounting systems enhance the possibility of losing a wheel cover.

A wheel cover which solves the problems encountered in the prior art would be a great advance in the transportation field.

SUMMARY OF THE INVENTION

In accordance with the present invention a novel and useful wheel cover for a vehicle is provided.

The wheel cover of the present invention utilizes a mounting member which possesses a first and an opposite second surface. The mounting member may be in the form of a beauty ring, wheel simulator, axle cover, and the like. The mounting member includes a multiplicity of openings which pass through the same from the first surface to the second surface thereof. The openings may be described as falling into a first group which pass over and fit around certain of the lug bolts and associated lug nuts. A second group of smaller openings pass over and fit around only the lug bolts of the vehicle wheel. Thus, the vehicle nut must be removed to accommodate the second group of openings. The first surface of the mounting member would lie adjacent the vehicle wheel outer surface when the particular nuts are removed.

The invention is also constructed with a multiplicity of resilient projections which at least partially surround the second group of openings of the mounting member. The multiplicity of projections are formed integrally with the mounting member. Each projection includes a first and a second portion which extends toward the vehicle wheel. An intermediate portion connects the first and second portions and includes a bend or crook. The first portion of the resilient projection is capable of bearing on the lug nut without interference with the seating of the nut and on the vehicle wheel.

Each resilient projection may include a lip which is connected to the second portion of each of the multiplicity of resilient projections. The lip extends outwardly from the vehicle wheel and may be used to engage another wheel accessory such as an axle cover.

It may be apparent that a novel and useful vehicle wheel cover has been described.

It is therefore an object of the present invention to provide a vehicle wheel cover which eliminates the need for separate washers or washer members to secure the vehicle wheel cover to a vehicle wheel.

It is another object of the present invention to provide a vehicle wheel cover which is rugged and relatively easy to install since it possesses a one-piece construction.

Another object of the present invention is to provide a wheel cover which is relatively simple and inexpensive to manufacture into beauty rings, wheel simulators, and other wheel accessories.

Yet another object of the present invention is to provide a wheel cover of unitary construction which will not separate from the wheel after being installed using conventional lug nuts and lug bolts.

The invention possesses other objects and advantages especially as concerns particular characteristics and features thereof which will become apparent as the specification continues.

BRIEF DESCRIPTION OF THE DRAWINGS

FIG. 1 is a cut-away perspective view of an embodiment of the invention in place on a typical wheel assembly having dual tires installed thereon.

FIG. 2 is a top plan view of an embodiment of the present invention.

FIG. 3 is a sectional view taken along line 3—3 of FIG. 2.

FIG. 4 is a sectional view of the present invention installed on a typical lug bolt using conventional lug nuts.

For a better understanding of the invention reference is made to the following detailed description of the preferred embodiments which should be referenced to the hereinabove described drawings.

DESCRIPTION OF THE PREFERRED EMBODIMENTS

Various aspects of the present invention will evolve from the following detailed description thereof which should be taken in conjunction with the heretofore described drawings.

The invention as a whole is identified in the drawings by reference character 10. The wheel cover 10 includes as one of its elements a mounting member 12 in the form of a "beauty ring" which may be constructed of metal such as stainless steel. Mounting member 12 fits on a wheel assembly 14, FIG. 1, which includes tires 16 and 18 utilizing inner dual 20 and outer dual 22 for support. Assembly 14 also includes axle cover 24 and a plurality of lug bolts and lug nuts 26. Returning to FIG. 2, it may be observed that mounting member 12 includes a multiplicity of openings 28. Alternate openings such as opening 30 constitute one group which are intended for passing over each lug bolt and lug nut of plurality of lug bolts and lug nuts 26. On the other hand, alternate openings such as opening 32 possess a smaller diameter to only fit over the lug bolts of plurality of lug bolts and lug nuts 26. Thus, lug nuts must be removed corresponding to the positions represented by opening 32 and alternate openings about the perimeter of circular mounting member 12. In otherwords, openings 30, 34, 36, 38, and 40 form group of openings 42 which are essentially larger than group of openings 44 consisting of openings 32, 46, 48, 50, and 52. Central opening 54 is intended to encompass the axis of wheel assembly 14; such axle being covered by axle cover 24 in FIG. 1. It should be noted that mounting member 12, being formed of stainless steel, exhibits a springy or resilient characteristic.

With reference to FIG. 3, it may observed that mounting member 12 includes a stamped resilient projection or protuberance 56 in the form of a circular bubble or hump which surrounds opening 32. Each opening of group of openings 44 includes such a resilient projection. Thus, any discussion concerning opening 32 also applies to the remaining openings of group of openings 44. Each projection 56 includes a first portion 58 and a second portion 60 which extend toward the vehicle wheel duals 20 and 22, FIG. 4, which will be discussed in greater detail hereinafter. Intermediate portion 62 of resilient projection 56 connects first and second portions 58 and 60. Intermediate portion 62 includes a bend or crook in this regard. Resilient projection 56 also includes a lip 64 connected to second portion 60 thereof. Lip 64 extends outwardly from wheel duals 20 and 22. Lip 64 is resilient or springy, as is the remainder of resilient projection 56.

Turning to FIG. 4, it may be observed that wheel assembly 14 is illustrated in section to show a compound lug bolt and lug nut assembly 66. Lug bolt 68 extends from axle hub 70. Lug bolt 68 extends through inner and outer duals 20 and 22 and threads through the interior of lug bolt 72, which extends further from duals 20 and 22. Lug bolt 66 includes a head or nut 74 which forces inner dual 20 against axle hub 70. Standard lug nut 74 threads onto threaded outer portion 76 of lug bolt 66. Outer dual 22 is held in this manner. It should be observed that mounting member 12 may include an extension 84 (phantom) connected to outer periphery 86 to form a full cover for wheel assembly 14.

In operation, mounting member 12 is place against the outer face 78 of outer dual 22. Group of openings 44 having resilient, similar to projection 56, projections are placed over the plurality of lug bolts, such as lug bolt 62, with plurality of nuts, such as nut 74, removed. The remaining group of openings 42 fit over plurality of lug bolts and lug nuts 26 without removal of the lug nuts. The nuts, such as nut 74, are then threaded onto the lug bolts such lug bolt 66, FIG. 4. The diameter of opening 32 is sized to prevent projection 56 from interfering with the seating of ramped portion 80 of nut 74 on outer dual 22. It should be noted that projection 56, being springy or resilient, expands outwardly from nut 74 during the seating action heretofore described. The end 82 of first portion 58 of projection 56 contacts outer surface 78 of outer dual 22 at this point. Lip 64 is forced against accessory 24 to hold the same in place. Thus, the use of separate expansion washers are eliminated by the present invention. Also, the wheel cover 10 permits the more accurate positioning of projection 56 on axle cover 24. In addition, projection 56 is not subject to shifting relative to the mounting member, as a result of centrifugal force acting on mounting member 12.

While in the foregoing embodiments of the invention have been set forth in considerable detail for the purpose of making a complete disclosure of the invention it may be apparent to those of ordinary skill in the art that numerous changes may be made in such details without departing from the spirit and principles of the invention.

What is claimed is:

1. A wheel cover for a vehicle wheel possessing a wheel outer face and having a pluralityof lug bolts and associated lug nuts, comprising;
    a. a mounting member including a first surface and a second surface, said mounting member further including a multiplicity of openings therethrough a first group of said openings passing over and fitting around one group of the lug bolts and associated lug nuts, a second group of said openings passing over and fitting around only the lug bolts of another group of lug bolts and associated lug nuts; said first surface of said mounting member lying adjacent the vehicle wheel outer face,
    b. a multiplicty of resilient projections at least partially surrounding said second group of openings, said multiplicity of projections formed integrally with said mounting member, each of said multiplicity of projections associated with one of said second group of openings including a first portion extending towards the vehicle wheel outer face, a second portion also extending toward the vehicle wheel outer face, said second portion positioned outwardly from said associated opening of said second group of openings, and each of said multiplicity of projections further including an intermediate portion connecting said first and second portions, said first portion of said resilient projection being capable of bearing on a lug nut without interference with the seating of the lug nut on the vehicle wheel, said resilient projection being capable of acting resiliently upon said lug nut bearing on said first portion of said resilient projection.

2. The wheel cover of claim 1 which further comprises a lip connected to said second portion of each of said multiplicity or resilient projections, said lip extending outwardly from the vehicle wheel.

3. The wheel cover of claim 2 in which said lip is a resilient body.

4. The wheel cover of claim 2 which additionally comprises a wheel accessory, said wheel accessory being held relative to the wheel by said lip.

5. The wheel cover of claim 4 in which said wheel accessory is an axle cover.

6. The wheel cover of claim 5 in which said first portion of said resilient projection extends closer to the wheel outer face than said second portion.

7. The wheel cover of claim 1 in which said first portion of said resilient projection contacts a portion of said wheel outer face.

8. The wheel cover of claim 1 in which said mounting member is an axle cover.

9. The wheel cover of claim 1 in which said mounting member is a wheel simulator.

* * * * *